MEANS OF RECORDING AND READING MICROWAVE ENERGY

Filed July 30, 1964 4 Sheets-Sheet 1

INVENTOR.
GERALD CHIPMAN
RICHARD L. PIERCE
WALTER GRENGG
BY [signature] ATTY.
[signature] AGENT

INVENTOR.
GERALD CHIPMAN
RICHARD L. PIERCE
BY WALTER GRENGG

D. E. Hodges ATTY.
Albert Sopp AGENT

INVENTOR.
GERALD CHIPMAN
RICHARD L. PIERCE
WALTER GRENGG
BY D. Hodges ATTY.
Albert Sopp AGENT

MEANS OF RECORDING AND READING MICROWAVE ENERGY

Filed July 30, 1964 4 Sheets-Sheet 4

INVENTOR.
GERALD CHIPMAN
RICHARD L. PIERCE
WALTER GRENGG
BY
ATTY.
AGENT

United States Patent Office 3,387,100

Patented June 4, 1968

3,387,100

MEANS OF RECORDING AND READING MICROWAVE ENERGY

Gerald Chipman, Madison, Richard L. Pierce, McFarland, and Walter Grengg, Madison, Wis., assignors to the United States of America as represented by the Secretary of the Navy Filed July 30, 1964, Ser. No. 387,550
6 Claims. (Cl. 179—100.2)

The present invention relates to a method and means for recording microwaves and more particularly, to a microwave recording and reproducing arrangement wherein guided microwaves are directly recorded on and reproduced from a moving recording medium.

The recording arrangement of the present invention utilizes a radiation magnetization effect similar to magnetization of a ferromagnetic material. The magnetized state to be obtained in the recording medium occurs in certain ferrites (e.g. $Mr_{0.2}Ni_{0.4}Zn_{0.4}Cu_{0.2}Fe_{1.8}O_4$) after irradiation of the ferrite with a high power, high frequency (X-band) standing wave and with the ferrite in a region of maximum magnetic field (H) strength. The strength of this effect for observation purposes depends upon the change in the microwave transmission characteristics of low power reproduction or read-out as compared with the transmission characteristics of the ferrite in its unmagnetized state. In other words, the observable signal strength depends upon the inherent signal-to-noise ratio of the ferrite recording medium as a transmitter. The magnetized effect has been found to persist indefinitely until the signal is erased, as by conventional erasing or demagnetization procedures.

It has further been found that if only a small portion of the ferrite recording medium is exposed to a region of high magnetic field strength in a standing wave pattern of X-band radiation, the radiation magnetization effect is advantageously confined to the irradiated portion.

Thus, because of the direct microwave recording techniques afforded by the present invention, the processing of microwave signals such as the ones employed in radar and communications systems in general, is greatly enhanced.

Accordingly, it is among the objects of the present invention to provide:

An arrangement for storing microwave energy;

Microwave recording arrangements for recording microwaves directly on a recording medium;

Microwave recording apparatus wherein waveguide means are employed for passing microwaves directly to a recording medium;

Apparatus for storing signal energy in microwave form on selected portion of a microwave-responsive recording medium;

Apparatus for recording microwave intensity and frequency via waveguide means on a continuously moving recording medium;

Apparatus for recording signal-containing parameters of microwave energy on a recording medium and for reading out the stored energy, and a system for recording guided microwave energy directly on a recording medium and for controlling the recording level in a compensatory manner.

Other objects as well as features and advantages of the present invention will be better understood by referring to the following description and accompanying drawings in which like numerals represent like parts and in which.

Figure 1:
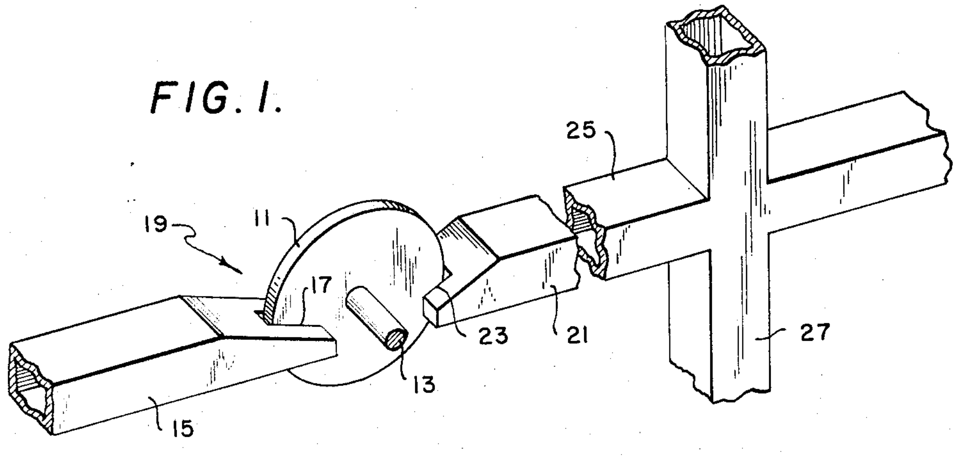
FIG. 1 is a view in perspective of microwave recording and readout apparatus in accordance with one version of the present invention.

Referring to FIG. 1, there is shown a moving ferrite disc 11 mounted on a shaft 13 and rotated by any suitable motor means. A tapered waveguide recording head 15 has a slot 17 traversing its end. The recording head 15 is located so that a peripheral portion 19 of the ferrite disc 11 including its edge passes through the slot 17. High power microwaves whose intensity is to be recorded on the ferrite disc 11 form a standing wave pattern in the tapered waveguide microwave recording head 15.

A read-out head 21 of construction which may be identical to that of the recording head 15, has a slot 23 thru which the edge portion 19 of the ferrite disc 11 passes. The output end of the read-out head 21 is connected to one of the balanced arms 25 of low power microwave bridge 27. A change in the microwave transmission characteristics of the magnetized disc region or portion 19 being read out causes the microwave bridge 27 to become unbalanced. The degree of imbalance can be determined by any suitable well-known electronic means so that the strength or intensity of the recorded microwave signals can be determined.

Figure 2:
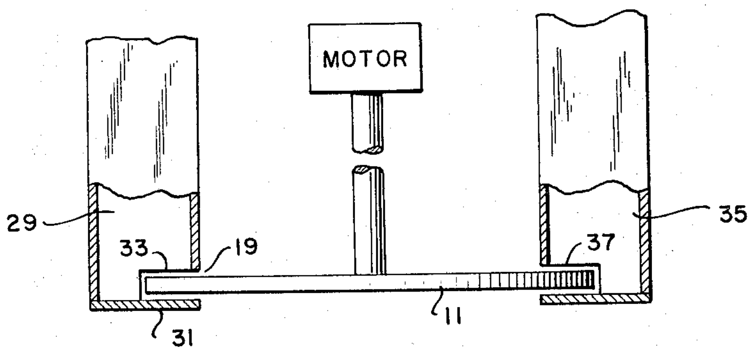
FIGS. 2–4 are views in cross-section of respectively different recording/read-out versions of the present invention.

In FIG. 2 there is shown in cross section another arrangement for recording and reading out the intensity of microwaves. A recording head 29 in the form of a rectangular waveguide has a "short" or conducting partition 31 closing its end. A straight-thru cut or slot 33 in the narrow side of the waveguide 29 is located as close as possible to the conductive partition 31. The slot 33 is thus located in the essentially high magnetic field region of the standing wave occurring in the waveguide recording head 29, so that when the edge portion of the ferrite disc 11 passes therethru, the incoming microwaves are recorded thereon.

A read-out head 35 having a slot 37, and being of construction identical to that of the recording head 29 is located in slot engaging relation to the disc 11. The read-out head 35 reproduces the recorded microwave signal intensity in the same manner as does the read-out head 21 discussed in conjunction with FIG. 1.

Figure 3:
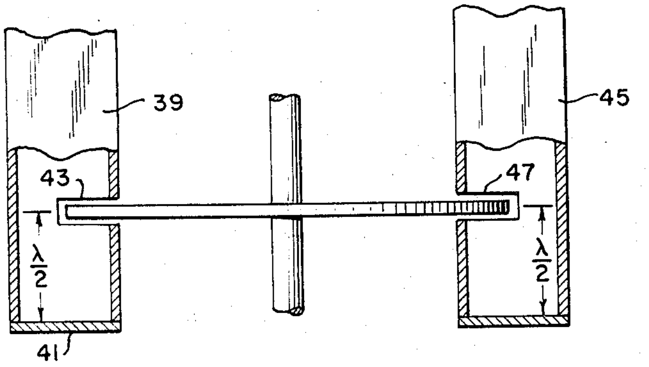

In the frequency-determining version shown in FIG. 3, there is provided a recording head 39 in the form of a rectangular waveguide with a conducting partition or "short" 41 closing its end. A straight thru cut or slot 43 is located on the narrow side of the waveguide head 39 with its transverse center line at a distance $\lambda/2$ from the short 41, where $\lambda$ is the wavelength corresponding to the maximum frequency in the range to be recorded. Since frequency is being measured, the intensity (amplitude) of the incoming radiation is maintained at a predetermined level by any suitable means.

A reproducing head 45 having a slot 47, and of construction identical to that of the head 39 is located so that the portion 19 of the ferrite disc 11 passes thru both slots 43 and 47. The intensity of the magnetic field at the peripheral portion 19 of the ferrite disc 11 as it passes thru the recording head slot 43 is at a maximum when the microwave frequency is such that the wavelength in the recording head is $\lambda$. At a lower frequency, the magnetic field strength H at the edge portion 19 of the ferrite disc 11 is reduced, resulting in a lower level of high frequency magnetization.

The intensity of the high frequency magnetization is reproduced as waves in the read-out head 45, and this intensity provides a frequency following parameter which may be calibrated to a frequency indication by any suitable electronic means. Read-out heads of the type shown in FIGS. 1 and 2 may alternatively be employed for reproducing the frequency-following intensity recorded on the ferrite disc 11.

Figures 4, 7:
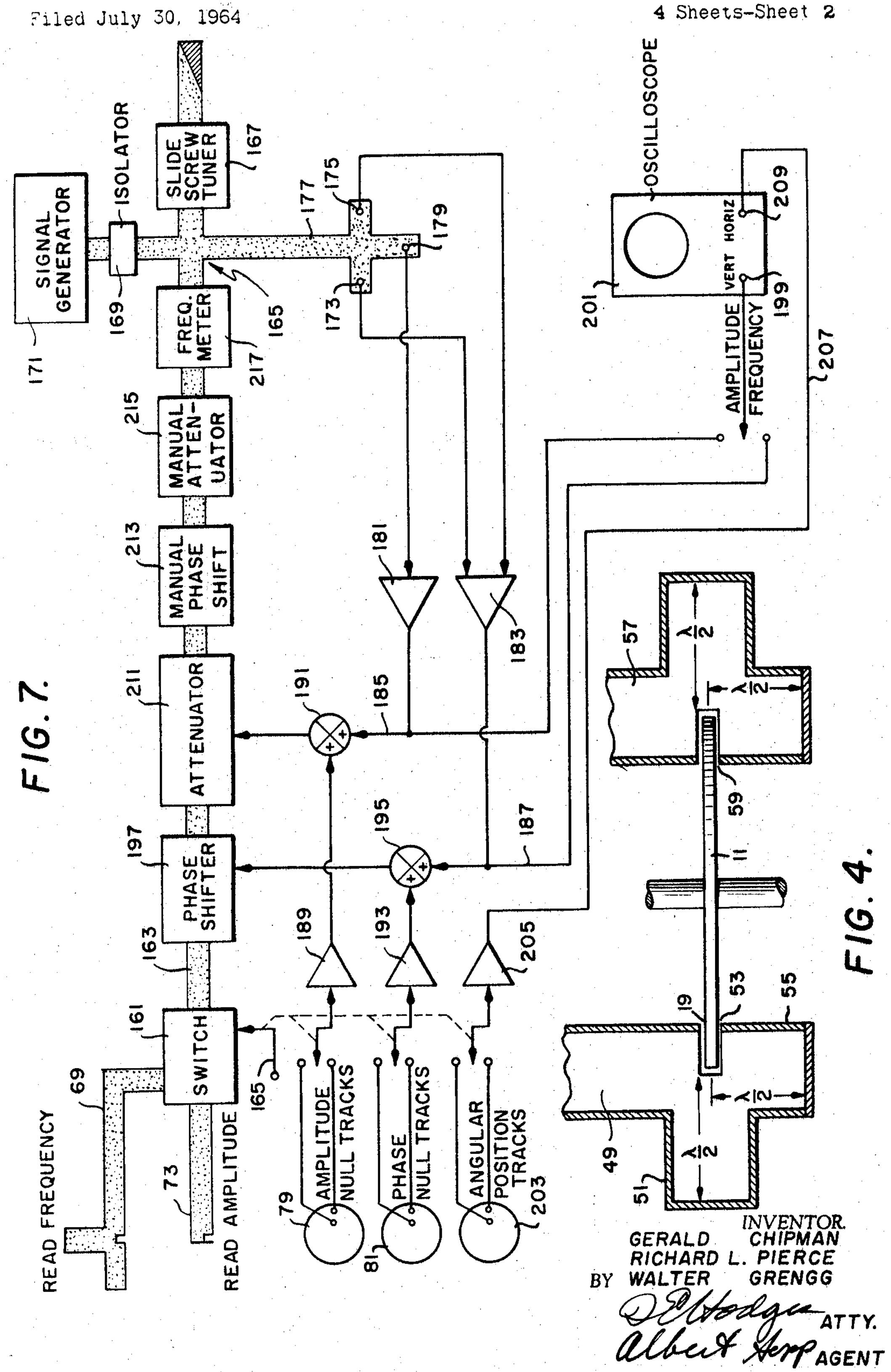
FIG. 7 is a view of a read-out system according to the invention in modified schematic form.

In the arrangement shown in FIG. 4, more precise frequency-following intensity read-outs may be obtained by providing in a waveguide recording head 49 a lateral waveguide short 51 located a distance equal to $\lambda/2$ transversely opposite a ferrite disc-receiving slot 53 as well as a longitudinal short 55 located a distance of $\lambda/2$ from the transverse centerline of the slot 53. A reproducing head 57 identical in construction to the recording head 49 is located so that its slot 59 receives the edge portion 19 of the ferrite disc 11. The output wave in the reproducing head 57 is read out in the same manner as that for receiving head 45 shown in FIG. 3.

Figure 5:
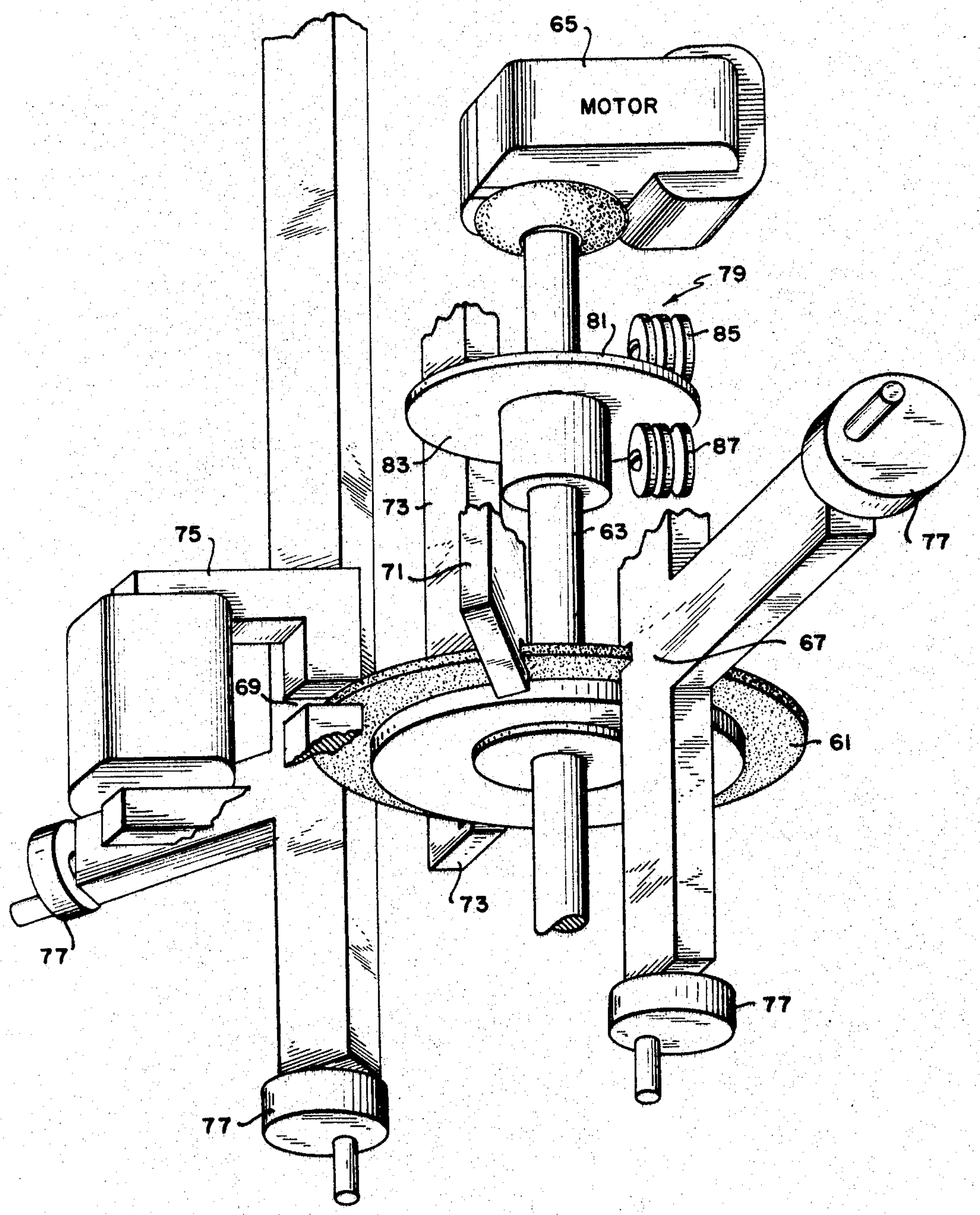
FIG. 5 is a view in perspective of a microwave recording/read-out arrangement including heads for erasing, for handling broad band microwave energy, and for handling narrow-band microwave energy.

A more elaborate microwave recording arrangement shown in FIG. 5 employs a ferrite disc 61 mounted on a drive shaft 63 and driven by a motor 65. Engaging the peripheral region of disc 61 via slots are frequency recording and read-out heads 67 and 69 respectively. Broad band amplitude recording and read-out heads 71 and 73 respectively also engage the periphery of the ferrite disc 61 via slots. The ferrite disc 61 passes between the two poles of an erase magnet 75 which demagnetizes the disc when energized.

Each of the frequency recording and read-out heads 67 and 69 may be provided with any suitable "short" adjusting means, such as movable conductive partitions (not shown) adjustable to position in the head waveguide portions, as by cranks 77. In this manner, the maximum point can be located on the peripheral region of the ferrite disc 61. The broad band record and read heads 71 and 73 may be so constructed that the H maximum point lies in the ferrite disc 61 for values of incoming frequencies.

A disc 79 having two magnetizable sides 81 and 83 is also mounted on the drive shaft 63. Three magnetic read/record heads 85 are coupled to the disc side 81, and another three read/record heads 87 are coupled to the other disc side 83. The respective read/record heads 85 and 87 in conjunction with the magnetic disc 79 provide two level compensating read/record signals which may be advantageously employed for eliminating interference with the microwave read-out display which may result from inhomogeneities in the ferrite disc 61. In such employment, the magnetic disc 79 may be prerecorded with signals corresponding to the location or occurrence of inhomogeneities in the ferrite disc 61. Thus the output signals in read-out heads 85 and 87 may provide level compensation signals to be applied in a compensatory manner to signals read out from the ferrite disc 61.

Figure 6:
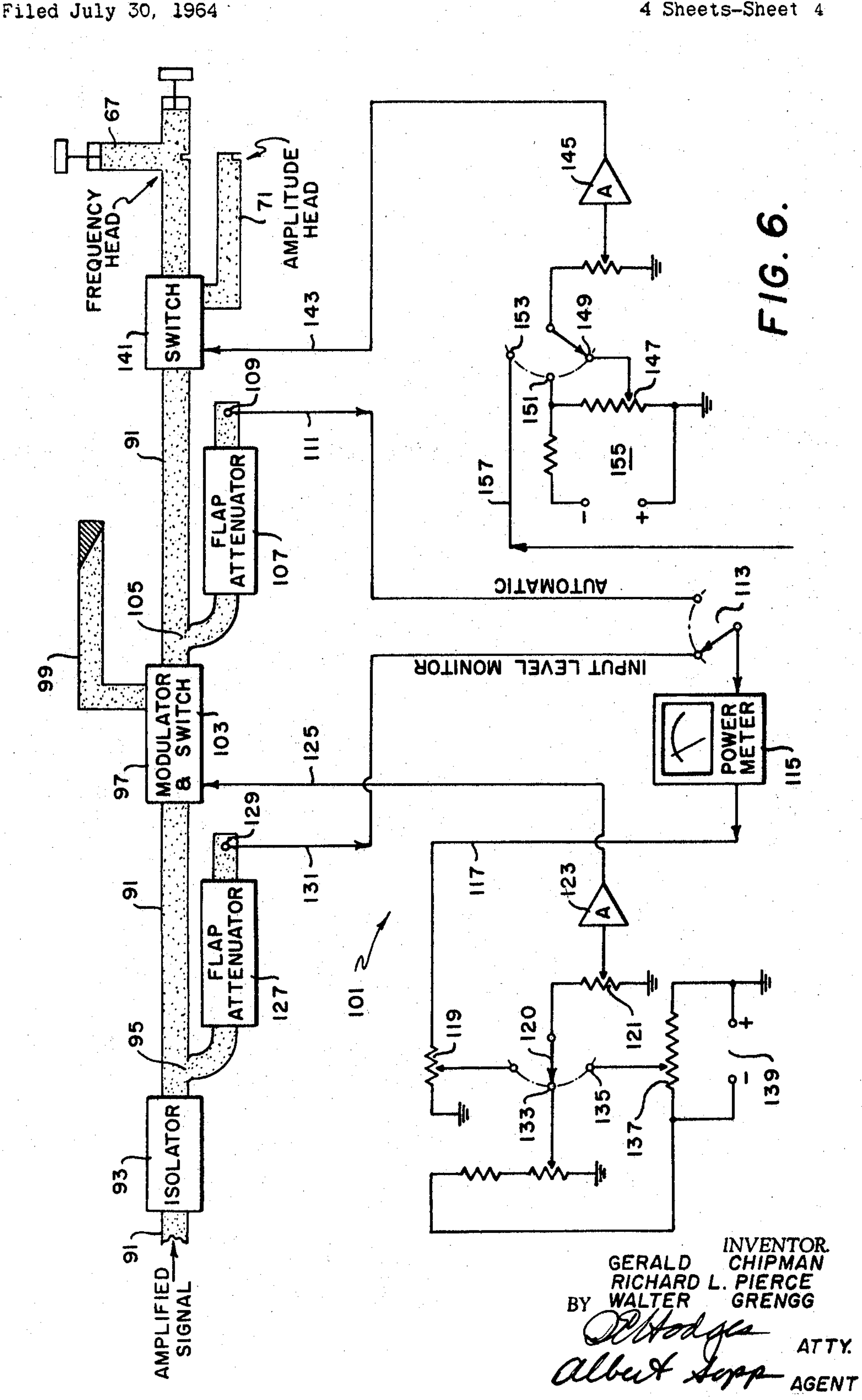
FIG. 6 is a view of the recording system according to the invention in modified schematic form.

Reference is now made to block diagram schematic of FIG. 6 which shows how the incoming signal to the frequency recording head is maintained at a given amplitude. The incoming signal appearing in a waveguide 91, and which may be amplified in any suitable manner, is passed via a suitable isolator 93 (for removing extraneous frequencies due to amplification) to a coupler 95. Part of the incoming signal continues traveling down the waveguide 91 and is fed thru a microwave modulator and switch 97 of well-known design which bypasses part of the incoming energy into a dummy power load 99, and transmits the desired energy level to the frequency record head 67. The desired energy level is obtained by a feedback circuit 101 which provides currents for continuously controlling the amplitude output of the modulator 97 via an input control terminal 103. In this manner, variations in the input signal may be compensated to provide a constant amplitude output from the modulator 97.

More specifically, the feedback circuit 101 may operate in two modes—automatic, or monitoring. For carrying out automatic feedback control, a branch 105 receives the output of the modulator 97 and feeds the signal via a flap attenuator 107 to an output terminal in which there is mounted a temperature compensated thermistor 109. The resistance of the thermistor 109 varies inversely with the temperature, said temperature being a function of the amplitude of the signal in the waveguide.

The output of the thermistor 109 is fed via a lead 111 and the contact arm of a switch 113 to a power meter 115 of any suitable design. The output of the meter 115 is passed via a lead 117 to a potentiometer 119 which may be preset to provide a desired signal intensity level to be maintained at the recording head 67.

From the potentiometer the signal energy is passed via a selector switch arm 120 to an adjustable input sensitivity controlling potentiometer 121 to an amplifier 123. When the resistance of the thermistor 109 decreases due to increasing incoming signal power, the voltage at the input of the amplifier 123 is increased. The output of the amplifier 123, which varies in accordance with the sensed signal power, is passed via a lead 125 to the modulator input control terminal 103. The terminal 103 may be coupled in any suitable well-known manner to the modulator 97 so that the varying currents introduced to the terminal increase or decrease the attenuation of the incoming signal in a manner to reduce the amplifier output correction to zero. This action enables the obtaining of an essentially constant incoming signal as seen by the recording head 67.

As an example, but not by way of limitation, the modulating action may be implemented by supplying currents from the amplifier 123 to the ferrite elements located in the waveguide 91 so that more or less of the incoming signal waves are reflected into the dummy power load 99.

To carry out the monitoring feedback mode, there is provided a flap attenuator 127 thru which a portion of the incoming signals is passed to a terminal in which there is mounted a thermistor 129. The thermistor 129 is coupled to the incoming signals in the same manner as described for thermistor 109 in relation to branch 105. The output of the thermistor 129 is passed via a suitable lead 131 to a contact of the switch 113. The contact arm of the switch 113 is thus connectable to the lead 131 instead of the lead 111. Consequently, power fluctuations in the incoming signals observable in the meter 115 provide the basis for compensation signals fed from the amplifier 123 to the modulator input control terminal 103, the action of the feedback circuit 101 being the same as that described for the automatic mode, except that the modulator output is not automatically self-compensated to a stable output.

As further shown in FIG. 6, the contact arm 120 is movable to an "off" position engaging contact 133 should it be desired to employ the recording head 67 for amplitude recording purposes. The contact arm 120 is also movable to a third position in contact with a terminal 135 for recording broad band amplitude and repetition rate. To this end the terminal 135 is located at one end of a contact arm of a potentiometer 137. The potentiometer 137 is connected to a suitable source of supply 139. Thus a constant voltage may be supplied to the amplifier 123 to provide a constant reference level for the modulator 97.

Of course, for broad band or amplitude recording, the broad band head 71 is employed. In order to switch from the frequency record head 67 to the broad band or amplitude head 71, a waveguide switch 141 of any suitable design is located along the wave guide 91 on the output side of the modulator 97. The switching of the waveguide switch 141 is controlled via a lead 143 by means of a driver amplifier 145 having an adjustable sensitivity control input resistance connectable via a contact arm 147. The arm 147 engages any one of three switching control contacts 149, 151, 153 respectively. With the contact arm 147 engaging contact 149, voltage from a suitable source of supply 155 drives the amplifier 145 to sufficient conduction to cause the switch 141 to divert essentially all of the incoming signal energy in waveguide 91 into the broad band recording head 71. With the contact arm engaging contact 151, which may be considered as the frequency discrimination (recording) contact, the switch 141 is not energized, thereby directing the incoming signals to the frequency recording head 67. If desired, the contact 153 may be employed for directing any suitable external control signals, for example, signals to cause rapid switching action, via a lead 157 to the amplifier 145.

Reference is now made to FIG. 7 in which there is shown the read-out system according to the invention. Recorded signals read out in the frequency reproduce head 69 or the broad band amplitude head 73 are fed to a microwave switch 161 of any suitable design, for selective coupling to a waveguide 163. The switch 161 may be controlled in any suitable manner via a control input terminal 165.

The waveguide 163 acts as the input arm of a magic tee waveguide bridge 165. An opposing arm of the bridge 165 has a slide screw tuner 167. The input reference wave for the bridge is received via an isolator 169 from a signal generator 171 of any suitable construction.

The microwave bridge 165 is kept in balance with respect to phase during amplitude or frequency read-out by means of an electronic phase shifter utilizing phase null-sensing crystal detectors 173 and 175 conventionally mounted on respective output shorts of a read-out arm 177 of the bridge. An amplitude sensing crystal detector 179 is located on a longitudinal short of the branch 177. The output of the amplitude sensing crystal detector 179 is passed to an amplifier 181, and the outputs of phase null detectors 173 and 175, which serve to sense the phase balance of the bridge 165 are fed to a differential amplifier 183. The output of the amplifier 181 is fed to a lead 185 for carrying the amplitude output of the read-out signals, and the output of the differential amplifier 183 is passed to a lead 187 for carrying signals representative of the phase balance of the bridge.

Since there are inhomogeneities in the ferrite disc 61, a small fluctuation in the current thru the phase shifting circuitry must occur to maintain the balance of the bridge 165 as the disc 61 rotates, even when there is no high frequency magnetization recorded on the disc. As already explained (FIG. 5), to eliminate this undesired current fluctuation, prerecorded compensating signals are picked up from the level compensating magnetic record disc sides 79 and 81 via the heads 85 and 87. These compensation signals correspond to amplitude and phase null tracks indicated in legend in FIG. 7.

The amplitude null-representing output of the disc side 79 is fed as one input via suitable switch means and via an amplifier 189 to a summing device 191 of any suitable well-known construction. The summing device 191 receives as its other input the amplitude representing signal from the amplifier 181 via the lead 185.

The phase null-representing output of the disc 81 is fed via suitable switching means and via an amplifier 193 to a summing device 195 as one input thereto. The summing device 195 receives as its other input the phase balance representative signals from the amplifier 183 via the lead 187.

A phase shifter 197 of any suitable construction is coupled to the waveguide 163 and receives the output of the summing device 195. The currents from the summing device 195 serve as control currents to cause the phase shifter to act on the incoming signal energy in a compensatory manner to eliminate phase distortion. Since the phase distortion caused by the ferrite disc 61 may be represented as part of the control currents impressed on the phase shifter 197 in a sense opposite to the sense of the phase distortion, the resultingly modified incoming signal energy as seen from the output of the amplifier 183 will contain essentially no phase distortion due to inhomogeneities in the ferrite disc. Consequently, the current supplied from the differential amplifier 183 for maintaining bridge balance is related to the frequency of the original incoming signal. This phase balancing signal output from the differential amplifier 183 may be fed to a vertical displacement input terminal 199 of an oscilloscope 201 for display purposes. The magnitude of this signal, displayed as a vertical displacement, is related to the frequency of the original microwave signal which produced the record in the ferrite disc 61.

Of course, in order to properly synchronize the display signal with the recorded microwaves, one of the disc sides 79, 81, or an additional disc 203 may be employed on the shaft 63 for providing angular track signals fed via a suitable amplifier 205 and a lead 207 to a horizontal sweep input terminal 209.

Inhomogeneities in the ferrite disc also cause amplitude fluctuations which would unfortuitously cause the balance bridge 165 to compensate therefor, giving an inaccurate reading of the true incoming signal amplitude. Therefore, a feedback correction is provided by feeding the output of the pre-recorded amplitude level compensating disc 79 via suitable switch means and the amplifier 189, to the summation device 191 for summing along with the signal amplitude representative output from the amplifier 181. The output of the summing device 191 provides control currents for adjusting a waveguide attenuator device 211 of any suitable construction coupled to the waveguide 163. The attenuator device 211 is adjusted in such a manner that the portion of the incoming signal energy representing ferrite disc amplitude inhomogeneities is effectively compensated by continuous adjustment of the attenuator. Therefore, the amplified output of the crystal detector 177 which appears at the output of the amplifier 181, for summation with the output of the amplifier 189 on lead 185 to drive the attenuator 211, represents the actual amplitude fluctuation of the incoming signals before recording. This signal may be fed via the lead 185 to the vertical input terminal 199 of the oscilloscope 201 to provide a measure of the initial microwave signal amplitude and duration.

If desired, a manually adjustable phase shifter 213, a manually adjustable attenuator 215, and a frequency meter 217 may be located along the waveguide 163 for providing additional control or calibration of the phase shifting and attenuation.

By way of example and not by way of limitation, the following specific components may be employed as circuit elements shown in FIGS. 6 and 7:

| | |
|---|---|
| Temperature compensated thermistors 109 and 129 | FXR X218A. |
| Modulator and switch 97 | Ferrotec R249L. |
| Power meter 115 | FXR B831A. |
| Switches 141 and 161 | Ferrotec R211LS. |

Obviously many modifications and variations of the present invention are possible in the light of the above teachings. It is therefore to be understood that within the scope of the appended claims the invention may be practiced otherwise than as specifically described.

We claim:

1. Apparatus for recording the frequency of microwave energy by radiation magnetization comprising:
- a waveguide; and
- a continuously moving recording medium passing through a slot in the side of the waveguide;
- said waveguide having a stub with a shorted end forming a cavity whose longitudinal axis is aligned with the aforementioned slot, said cavity being connected into the side of the waveguide carrying the microwave energy whose frequency is to be recorded.

2. Apparatus for recording the frequency of microwave energy by radiation magnetization comprising:
a waveguide; and
a continuously moving recording medium passing through a slot in the side of the waveguide;
said waveguide having a stub with a shorted end forming a cavity whose longitudinal axis is aligned with the aforementioned slot, said cavity being connected into the side of the waveguide carrying the microwave energy whose frequency is to be recorded.

3. Apparatus for reading out a record of microwave intensity comprising:
a hollow conductive waveguide;
a continuously moving record medium passing through a slot opening in the closed end of the hollow conductive waveguide;
a microwave bridge; and
a source of low intensity microwaves for said bridge;
said waveguide being connected to a microwave bridge.

4. Apparatus for reading out a record of microwave frequency comprising:
a waveguide;
a continuously moving record passing through a slot in the side of the waveguide;
a microwave bridge connected to said waveguide;
a source of low energy microwaves connected to said bridge;
said waveguide being closed by a short and said slot being a distance from the short equal to one half the wavelength in the waveguide of the frequency of the low energy microwaves used in said read-out microwave bridge.

5. Apparatus for reading out a record of microwave frequency comprising:
a waveguide; and
a continuously moving record passing through a slot in the side of the waveguide and a waveguide stub with a shorted end forming a cavity whose longitudinal axis is aligned with the aforementioned slot, said cavity being connected into the side of the waveguide.

6. Apparatus for reading out a record of microwave frequency comprising:
a hollow conductive waveguide;
a continuously moving record passing through a slot opening in the closed end of the hollow conductive waveguide;
a microwave bridge;
a source of low frequency microwaves connected to said bridge; and
means connecting said waveguide to the microwave bridge.

References Cited

UNITED STATES PATENTS 3,137,841 6/1964 Ryder ------------ 346—74 X

BERNARD KONICK, *Primary Examiner.*

RODNEY D. BENNETT, *Examiner.*

C. E. WANDS, *Assistant Examiner.*